US006964699B1

United States Patent
Carns et al.

(10) Patent No.: US 6,964,699 B1
(45) Date of Patent: Nov. 15, 2005

(54) ROCKET MOTOR EXHAUST SCRUBBER

(75) Inventors: Richard H. Carns, Byantown, MD (US); Gerald Armstrong, Hughesville, MD (US); Robert H. Rast, Nanjemoy, MD (US); Dennis R. Mitchell, Brooking, OR (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 427 days.

(21) Appl. No.: 10/166,275

(22) Filed: Jun. 5, 2002

(51) Int. Cl.$^7$ .......................... B01D 47/00; B01D 53/14
(52) U.S. Cl. .............................. 96/361; 96/363; 60/264
(58) Field of Search .......................... 96/355, 361, 363, 96/371, 270, 271, 322; 261/115; 95/233, 95/234, 199, 200, 214, 216; 60/264

(56) References Cited

U.S. PATENT DOCUMENTS

| | | | |
|---|---|---|---|
| 4,067,703 A | | 1/1978 | Dullien et al. .................. 55/92 |
| 4,127,621 A | * | 11/1978 | Berst et al. .................. 261/118 |
| 4,165,973 A | * | 8/1979 | Stergiou ...................... 96/237 |
| 4,539,190 A | | 9/1985 | Shinoda et al. ............. 423/240 |
| 4,990,317 A | | 2/1991 | Mak et al. ............... 423/215.5 |
| 5,122,169 A | * | 6/1992 | Schumacher et al. ......... 96/242 |
| 5,274,998 A | | 1/1994 | Geisler ......................... 60/220 |
| 5,565,180 A | | 10/1996 | Spink ......................... 423/220 |
| 5,863,316 A | | 1/1999 | Lordo et al. .................. 95/204 |
| 5,955,037 A | | 9/1999 | Holst et al. ................. 422/171 |
| 6,017,384 A | | 1/2000 | Risse .......................... 96/244 |
| 6,207,120 B1 | | 3/2001 | Belmonte et al. ........... 423/210 |
| 6,217,640 B1 | | 4/2001 | Lu et al. ....................... 96/243 |
| 6,251,168 B1 | | 6/2001 | Birmingham et al. ......... 95/268 |
| 6,284,022 B1 | | 9/2001 | Sachweh et al. .............. 95/149 |

* cited by examiner

Primary Examiner—Frank M. Lawrence
(74) Attorney, Agent, or Firm—Fredric Zimmerman

(57) ABSTRACT

A wet scrubber having a series of chambers for capturing and cooling exhaust gases generated during static test firing of rocket motors. Exhaust gas enters an inlet to a first chamber and is cooled and slowed by a spray solution. HCL gas is condensed and absorbed by the spray solution and precipitates to a liquid slurry at the bottom of the device. The remaining exhaust products enter a demister chamber where nozzles continue to spray the gasses as they pass upward and through a mesh-style demister at the top of the vessel. The demister filters liquid and solid waste particles from the gas stream, and the clean, dry gases are accelerated through a centrifugal fan into the atmosphere. A deflector is positioned within the inlet to the first chamber for containing parts in the event of a motor mal-function.

20 Claims, 2 Drawing Sheets

| MOTOR | FILTER No.- 10 micron | WEIGHT GAIN gram | FILTER No.- 1 micron | WEIGHT GAIN gram | SUM (10 + 1) | CALC REMOVAL EFF-% | Cl ppm | CALC REMOVAL EFF-% |
|---|---|---|---|---|---|---|---|---|
| 1 | 1 | 0.0001 | 1 | 0.0099 | 0.01 | 32.4 | 0.032 | 99+ |
| 1 | 2 | 0.0001 | 2 | 0.0066 | 0.0067 | 55.4 | 0.045 | 99+ |
| 4 | 3 | 0.0007 | 3 | 0.0002 | 0.0009 | 93.9 | 0.033 | 99+ |
| 4 | 4 | 0.0012 | 4 | 0.0002 | 0.0014 | 90.5 | 0.022 | 99+ |
| 5 | 5 | 0.0009 | 5 | 0.0001 | 0.001 | 93.2 | 0.028 | 99+ |
| 5 | 6 | 0.0007 | 6 | 0.0002 | 0.0009 | 93.9 | 0.053 | 99+ |
| 6 | 7 | 0.0012 | 7 | 0.0001 | 0.0013 | 91.2 | 0.012 | 99+ |
| 6 | 8 | 0.0017 | 8 | 0.0001 | 0.0018 | 87.8 | 0.023 | 99+ |
| | | | | | AVERAGE (EXCLUDING 1&2) | 91.75 | AVERAGE | 99+ |

FIG. 2

ROCKET MOTOR EXHAUST SCRUBBER

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field of the invention

The present invention relates to an apparatus for scrubbing exhaust gases, and more particularly to a scrubber for removing waste gases from exhaust generated when rocket motors are test fired, in a manner that is both environmentally compliant and economically acceptable.

2. Description of the Background

The United States Department of Defense test fires thousands of rocket motors each year for lot acceptance testing, rocket motor development, and surveillance testing of fleet returned motors. Rockets range in size up to 1,000,000 pounds (propellant weight). Test firing these rockets produces tons of gaseous products every year, most of which is of concern to the Environmental Protection Agency.

When rocket motors are fired during static testing procedures, most of the rocket propellant is burned and the combustion products are exhausted from the rocket motor through a motor nozzle. Rocket motor emissions are a point source of pollution as they contain toxic compounds and heavy metals, many of which are on the Environmental Protection Agency's List of Controlled Substances. The combustion products include gaseous HCl, $Al_2 O_3$, CO and Pb, although the combustion products will vary depending upon propellant composition. Different propellants have different combustion products, although most are similar in nature.

There are some devices known as "scrubbers" for cleaning waste gas emissions in other contexts. Specifically, prior art "scrubbers" have addressed the cleaning of effluents generated from industrial waste streams. A process for treating waste gases produced from an industrial process is shown, for example, in U.S. Pat. No. 4,990,317 to Mak, et al. The process comprises contacting the waste gas in a reaction unit with an alkaline brine solution under conditions such that the HCl reacts with the alkali to form a chloride salt. The gas is then conducted to a scrubber for further treatment and removal of any residual HCl. Finally, according to the process, a demister apparatus gives the gas a final wash with fresh water before being released into the atmosphere. The invention includes a process for the treatment of waste gas containing HCl wherein the gas is at an elevated temperature. The Mak '317 process is a continuous flow process and is not suitable for use with rocket motors. The process is not designed to capture and clean gases emitted at the high velocities attained by rocket motor exhaust gases.

U.S. Pat. No. 5,955,037 to Holst, et al. illustrates another system for the treatment of industrial effluent gases produced in semiconductor manufacturing processes. The device shows a treatment chamber for acid gas and particulate removal, an oxidizer exhaust gas quenching unit, an acid gas scrubber, and a flow-inducing means such as a fan for active motive flow of the gas through the system.

U.S. Pat. No. 5,122,169 to Schumacher, et al. discloses yet another apparatus for the removal of pollutant gases and liquid droplets from a gas stream generated from manufacturing processes. The system illustrates a scrubbing apparatus, a spray injection system for spraying scrubbing fluid in droplet form through the gas stream, an absorption screen, and a diffusion filter for removal of residual liquid droplets.

The foregoing and other commercial" scrubbers on the market are mainly for normal industrial conditions in environments of reasonably uniform operating conditions. They do not contemplate the temperature and velocity extremes present in the exhaust of a rocket motor. Scrubbing rocket motor gases poses unique challenges because the gases emitted are very hot, reaching temperatures of 3500 degrees Fahrenheit, and are expelled at very high velocities, averaging up to 2900 ft/sec. Furthermore, in the context of a static test of a rocket motor, care must be taken so that the scrubber does not influence the thrust and performance capabilities of the rocket being tested. Furthermore most industrial scrubbers are not concerned with avoiding any performance impact on a rocket motor being fired into the scrubber. The only reason for performance testing a rocket motor is to get accurate performance data. If the scrubber influences the performance data, there is no reason to perform the test.

There has been one known effort to develop a rocket exhaust scrubber at Edwards Air Force Base. However, this scrubber was very intrusive and did not measure the thrust and performance capabilities of the rocket being tested. Significantly, the Edwards scrubber employed a static ventilation flow path which causes a pressure rise at the end of firing when the rocket motor exhaust gas velocity head is converted into static pressure, which induces back pressure on the rocket motor providing an less accurate thrust measurement.

In addition, the Edwards scrubber caused a potential for ignition of the H2 and CO in the rocket exhaust. After a rocket motor fires there is nearly always a flammable quantity of these gases present, and when the exhaust gases combine/mix with the ambient air already in the scrubbed or added air, a serious potential for ignition exists. The Edwards scrubber was also prone to overpressure, and secondary combustion of the exhaust gases. These pressures and temperatures caused problems as it exceeded the physical limits of the scrubber. Also, the Edwards scrubber made no provisions for recycling the spray solution.

Aside from the foregoing, there also are a number of existing high altitude test chambers at Arnold Air Force Base that capture and provide some "washing" of gases with cooling water, but these are high altitude testing chambers and are not well-suited for production testing of rocket motors.

There currently are no known existing rocket motor exhaust scrubbers capable of accurately, safely, and economically measuring thrust in an environmentally acceptable manner.

Accordingly, it would be advantageous to provide a device that collects and scrubs rocket motor exhaust during test firing to remove toxic chemicals, heavy metals and particulates from the waste gas stream. It would further be advantageous that the device capture and clean the exhaust stream without impeding the thrust and performance capabilities of the rocket motor being tested. Additionally, it would be advantageous that the device capture and cool the gases that are emitted at the high velocities and elevated temperatures characteristic of rocket motor exhausts.

SUMMARY OF THE INVENTION

It is, therefore, an object of the present invention to provide an apparatus for scrubbing rocket motor exhaust gases emitted during test firing of rocket motors to remove hazardous pollutant gases.

It is another object of the present invention to capture exhaust gases during the test firing of rocket motors without compromising thrust or performance capabilities of the rocket under test.

It is yet another object of the present invention to provide positive flow of the exhaust gases through the scrubber to ensure that all gases are scrubbed, and to purge the system with clean air after a test firing.

It is still further an object of the present invention to provide a device that significantly reduces the probability of an ignition of the combustible gases from a static discharge.

According to the present invention, the above-described and other objects are accomplished by providing a rocket motor exhaust scrubber that cleans the motor exhaust while the motor is firing. The rocket motor is instrumented and located to fire directly into the present invention, which is a wet scrubber. The motor gases are vigorously sprayed with a solution of water with caustic KOH additive. The spray cools the gases from 3500 F to 195 F, agglomerates the solids, and captures and neutralizes the HCl gases formed when the composite type propellant is burned. The liquids and solids are removed by passing the wet, dirty gases through a mesh style demister, and then the cleaned gases are released to the atmosphere. The device effectively captures, cools, and removes pollutants from exhaust gas streams generated when rocket motors are test fired. The scrubber comprises a first chamber for capturing exhaust gases which consists of a quench chamber where spray nozzles inject the caustic spray solution. The temperature of the hot exhaust gases is quickly reduced, and the primary combustion product, gaseous HCL, is condensed and absorbed by the caustic solution. The remaining exhaust products (such as $Al_2 O_3$, CO, Pb, etc.) exit the quench chamber either in a liquid slurry or a cool wet gas, and enter a demister chamber. In the demister vessel, a spray system again scrubs the gasses by spraying caustic solution through the gas stream as it passes upward and through the vessel. A mesh-style demister at the top of the vessel intercepts and captures the liquid and solid particles, and the resulting clean and dry gases (e.g., mist-free or liquid free gases) are accelerated through a centrifugal fan into the atmosphere. The fan at the discharge creates a forced ventilation system that provides a continuous flow of air so that when the rocket motor fires there is already a system flow path and the exhaust is "guided" into the scrubber. This eliminates any pressure rise at the end of firing when the rocket motor exhaust gas velocity head is converted into static pressure, and it provides a means of purging the exhaust gases between motor firings. The forced flow also pre-wets all of the steel internals with spray solution prior to igniting the motor, and also prepares the mesh demister for operation. The forced ventilation system also inhales and scrubs the last small vestiges of propellant which continue to burn for several seconds after the motor firing, and eliminates the acrid smell present for minutes after firing (the fumes causing the odor are also an irritant to operators). Containing and scrubbing all of the exhaust gases also eliminates particulates in the immediate firing area that can contaminate surface water runoff.

BRIEF DESCRIPTION OF THE DRAWINGS

Other objects, features, and advantages of the present invention will become more apparent from the following detailed description of the preferred embodiments and certain modifications thereof when taken together with the accompanying drawings in which:

FIG. 2 is a table illustrating test results for the rocket motor exhaust scrubber 10 of FIG. 1.

DETAILED DESCRIPTION OF THE PREFERRED EMBODIMENTS

Figure 1:
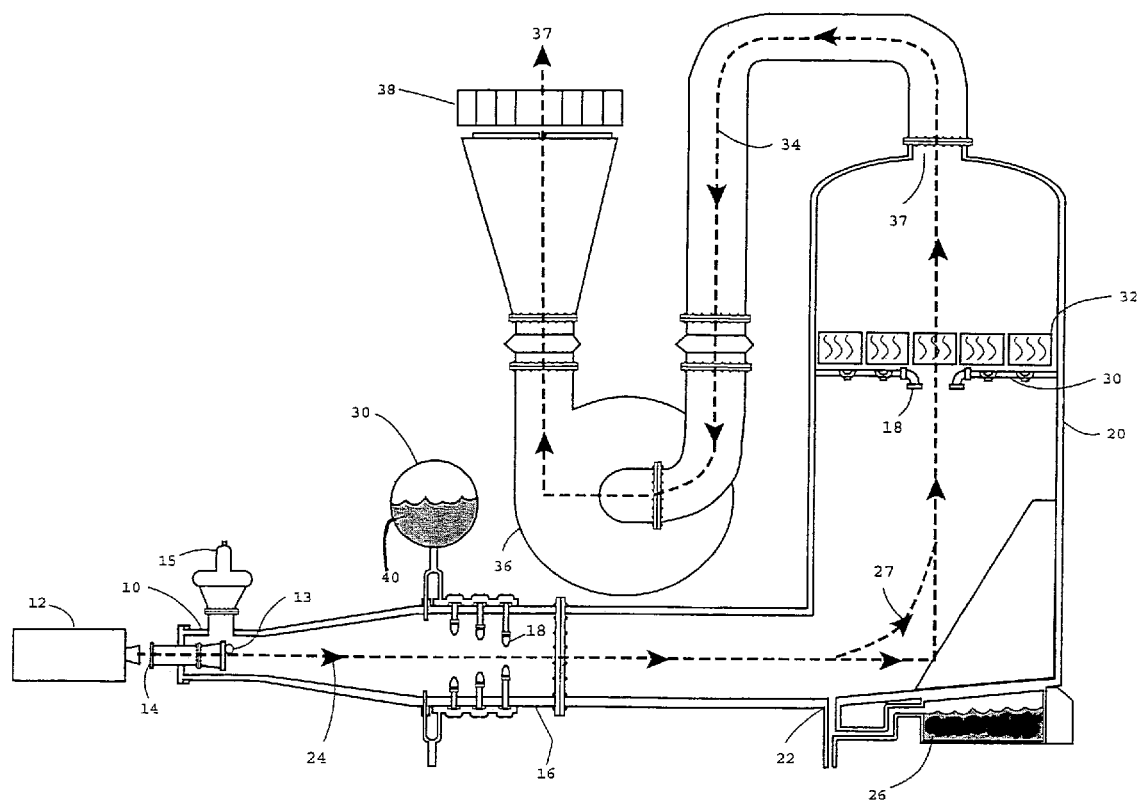
FIG. 1 is a side schematic diagram of the rocket motor exhaust scrubber 10 of the present invention.

FIG. 1 is a side perspective schematic view of the rocket motor exhaust scrubber 10 according to the present invention. A test rocket motor 12 is secured adjacent to an inlet 14 in scrubber 10. Inlet 14 is a hollow cylindrical chamber for transporting exhaust gases 24 from rocket motor 12 into scrubber 10. The inlet 14 is preferably a tube that is approximately 12" long, and completely enclosed inside the scrubber 10, although one skilled in the art will understand that the exact length and diameter of inlet 14 are dependent on the nozzle and plume of the firing motor nozzle.

Motor 12 is situated such that it does not touch inlet 14, but is close enough that it captures exhaust gases 24 when the rocket motor is fired. This is accomplished by sizing the diameter of inlet 14 in accordance with the spacing between motor 12 and inlet 14 so that the motor plume will expand to the inner diameter of the inlet 14 before entering the scrubber 10 (expansion characteristics for the plumes of most motors are readily available). This effectively seals the scrubber 10/motor interface, eliminating the anticipated thrust effect of outside air flowing around the motor and then into the scrubber 10. In this way, exhaust gases 24 flow freely, and the thrust measurement of the rocket motor is not affected by the presence of scrubber 10.

Preferably, a shield/guard 13 is located at the end of the inlet 14 to minimize damage to the scrubber 10 in case a rocket motor self-destructs, sending items into the scrubber 10. Shield/guard 13 comprises a steel cruciform which may be fabricated from steel bars welded to form an "X" or cross designed to stop large solid parts exhausted into the scrubber 10.

In addition to the shield/guard 13, the inlet 14 is equipped with a combination pressure relief valve and vacuum breaker 15 to guard against over-pressure. A variety of suitable valves are readily available.

Inlet 14 terminates in quench chamber 16. Chamber 16 comprises a hollow chamber, whose interior is lined with a plurality of spray nozzles 18 connected to a spray injection system 30 for injecting a caustic spray solution 40 into the stream of hot gases 24. Spray solution 40 preferably comprises a combination of water and a caustic (e.g., potassium hydroxide KOH). Water alone will remove the HCl nearly as effectively, but the caustic reduces corrosion. KOH is presently preferred for its solubility and comparatively low cost. Maintaining the caustic spray solution at a high pH significantly reduces the corrosion effect of scrubber 10. The scrubber may thereby be constructed from economical materials such as carbon steel, which has the additional benefit of being sturdy enough to withstand over-pressures in the event of a secondary ignition. After a rocket motor fires there is nearly always a quantity of flammable gases present, and when the exhaust gases combine/mix with ambient air, a serious potential for ignition exists. The present scrubber 10 addresses this issue, trying to eliminate ignition. Carbon steel construction helps to eliminate ignition because it is electrically conductive. In addition, it has high stress limits, thereby avoiding the consequences of over pressure conditions (which would be caused by ignition). The above-described Edwards system used a plastic dewater system and a fiberglass enclosure which contributed to ignition of the gases and was damaged by the results of the ignition.

Quench chamber 16 is connected to Demister chamber 20 that comprises a hollow tank. A port 22 on one side of demister chamber 20 links it to quench chamber 16 for admitting the exhaust products treated in chamber 16. The treated exhaust products comprise cooled exhaust gases 27 and a liquid slurry 26. The Slurry 26 is collected in the bottom of chamber 20 where the liquid component is pumped, filtered and stored for reuse. The filtered solids are removed in bag filters for waste disposal.

Chamber 20 also contains nozzles 18 connected to the spray injection system 30. The injection system 30 sprays solution 40 through the gas stream 27, and continues to scrub and cool the gases as they pass through the chamber 20. The caustic spray solution 40 (KOH), absorbs and neutralizes the HCL and flushes the particulates into the demister chamber 20.

Chamber 20 is equipped with a demister 32 for removing liquid or solid particles carried in the rising gases as they pass out of chamber 20. Demister 32 is preferably a mesh (for example, as fabricated by Techmark®) or like style demister comprising a fibrous or filamentary mesh material. The action in the mesh is characterized as separation by impingement, coalescence and drainage. Preferably, the mesh is a monel material rated to withstand over 700 EF without harm, and is rated to remove 99+% at 10 micron, 85% of the 5 micron, 60% of the 4 micron, and 4% of the 2 micron particulates (these specification are for water in air; water has a SpGr of 1, lead has a SpGr of 13.6 and is more efficiently removed). The mesh-style demister 32 is used in lieu of polypropylene tellerettes. This way, the mesh is electrically conductive, more efficient, and it is installed horizontally for a vertical gas flow. It should be understood that manipulation of velocity, and mesh significantly affects the removal efficiency, and the mesh used in demister 32 may be varied without departing from the scope and spirit of the invention.

A duct 34 is connected downstream of demister 32 for venting the clean dry exhaust gases 37 from chamber 20. A downstream centrifugal fan 36 accelerates gases 37 through duct 34 and exhausts the gases into the atmosphere.

Particulate elimination means such as a filter 38 is optionally installed at the exit of duct 34. Filter 38 preferably comprises a HEPA or ultra HEPA filter that further improves particulate removal to the 99.9% range.

Again, each of the above described components (inlet 14, quench chamber 16, demister chamber 20, duct 34, and fan 36) of scrubber 10 preferably comprises a metallic and electrically conductive material, such as carbon steel, which significantly reduces the probability of an ignition of the combustible gases from a static discharge.

A test rocket is held and instrumented at inlet 14. Upon ignition, exhaust gases pass through inlet 14 and enter scrubber quench chamber 16. Chamber 30 is pressurized with 100–150 PSIG compressed air in order that spray solution 40 is injected as small liquid spray droplets. A high spray solution flow rate and small droplet size provide efficient heat and mass transfer between the spray solution 40 and exhaust gases. The temperature of the exhaust gases is reduced from approximately 3500 Fahrenheit to 195 Fahrenheit. Gaseous HCl is condensed and absorbed by the spray solution, and the remaining targeted combustion products such as $Al_2O_3$, and Pb are cooled and condense to form a precipitate that collects at the bottom of quench chamber 16.

In operation, the scrubber cools, cleans, and releases the exhaust within 2–3 seconds of entry. Actual testing by the inventors has revealed that approximately 17% of the solution is vaporized and mixes with the exhaust gases as a steam 27. The other 83% remains as a liquid and falls to the bottom of quench chamber 16 forming a liquid slurry 26. Slurry 26 is collected in the bottom of chamber 20 then the liquid component of the slurry is filtered and recycled for re-use as caustic spray solution 40. Solid waste is removed from this slurry in filters for disposal. Spray injection system 30 sprays caustic solution 40 into gas stream 27 thereby further scrubbing and cooling the gases as they pass through the chamber. The invention described herein has been tested at a rate of 7 pounds/second, and with motors of up to 11.4 pounds, and without the optional filter 38. Scrubbing efficiency is very good: Removal of HCl is 99.9%+, particulate removal is 90–92%, and lead removal is 94% with much of the particulate and lead remaining in the gas less than 1 micron. Additional particulate removal can be accomplished by the addition of a HEPA or ultra-HEPA filter 38 after the fan (36). The system thereby presents a real time wet scrubber that quickly and thoroughly cools and cleans rocket motor exhaust gases without impeding the thrust or performance capabilities of the rocket under test. The above-described scrubber 10 according to the instant invention provides an effective exhaust scrubber adaptable for use in test firing all common rocket motors, and removes 99+% of gaseous HCl and 90+% particulates without adversely impacting the accuracy of rocket motor test data.

FIG. 2 depicts test data taken from a motor firings into the scrubber 10 of the present invention with 7 pound propellant weight using an Mk 66, a double base propellant. Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

We claim:

1. A device for the removal/remediation of pollutants from rocket motor exhaust gas, comprising:
an inlet tube for transporting an exhaust gas from a rocket motor to a quench chamber for cooling and slowing said exhaust gas;
a spray injection system within said quench chamber for spraying a solution into a stream of said exhaust gas; and
a demister downstream of said quench chamber for filtering particulate waste from said stream of said exhaust gas,
wherein said exhaust gas, which includes pollutants, generated during test firing of said rocket motor is captured, cooled and cleaned before being emitted into atmosphere, and
wherein said inlet tube is upstream from said quench chamber so that said inlet tube is intermediate said rocket motor and said quench chamber.

2. The device according to claim 1, wherein said pollutants include gaseous hydrochloric acid, aluminum oxide, and lead.

3. The device according to claim 1, further comprising a centrifugal fan downstream from said demister for drawing said exhaust gases through the device.

4. The device according to claim 1, further comprising a filter located downstream of said demister for trapping particulates from said stream.

5. The device according to claim 1, wherein said demister is substantially parallel to said quench chamber.

6. The device according to claim 1, wherein said solution comprises a solution of water and potassium hydroxide.

7. The device according to claim 1, wherein said demister comprises a mesh material for removing liquid and solid particles.

8. The device according to claim 1, further comprising
a fan downstream of said demister for accelerating said exhaust gas from said demister through a duct and into the atmosphere.

9. The device according to claim 8, further comprising a filter located at a discharge end of said duct for trapping particulates from said exhaust gas.

10. The device according to claim 1, wherein said inlet tube and said quench chamber are comprised of at least one of an electrically conductive material and a metallic material.

11. The device according to claim 1, wherein said solution comprises a solution of water and a caustic chemical compound.

12. The device according to claim 8, wherein said demister comprises at least one of a fibrous material and a filamentary material for removing liquid and solid particles.

13. A device for the removal/remediation of pollutants from rocket motor exhaust gas, comprising:
an inlet for capturing and transporting exhaust gas;
a quench chamber adjacent to said inlet and in fluid communication therewith for receiving said gas from said inlet, said quench chamber having a plurality of nozzles inside said chamber for spraying a high pressure solution into the exhaust gas to produce a liquid slurry comprising a mixture of said solution and toxic particles within said exhaust gas;
a demister chamber adjacent said quench chamber and in fluid communication therewith for receiving said exhaust gas from said quench chamber, and for collecting said liquid slurry and cleaning said pollutants, the demister chamber further having a plurality of nozzles inside said demister chamber for spraying said exhaust gas;
a demister at an outlet of said demister chamber for filtering liquid and solid particles from said exhaust gas;
a fan downstream of said demister for accelerating said exhaust gas from said demister through a duct and into the atmosphere; and
a conductive shield/guard located in said inlet for preventing entry of objects to said quench chamber.

14. A device for the removal/remediation of pollutants from the exhaust gas of a rocket motor, comprising:
a scrubber comprising an inlet,
wherein said rocket motor is held stationary at a remote distance in advance of said inlet during firing so as not to contact said inlet, and
wherein said inlet having an inner diameter sized in accordance with said remote distance such that a plume from said rocket motor expands to conform to the inner diameter of the inlet upon entry thereto.

15. The device according to claim 1, wherein said inlet tube comprises a hollow cylindrical chamber, a first opening adjacent said rocket motor, and a second opening terminating at said quench chamber, and
wherein said inlet tube is substantially enclosed inside said device.

16. The device according to claim 1, further comprising a pressure relief valve and vacuum breaker substantially adjacent to said inlet tube.

17. The device according to claim 1, wherein said quench chamber is connected to a demister chamber, said demister chamber comprises a plurality of nozzles connected to said spray injection system.

18. The device according to claim 1, wherein said spray injection system comprises a plurality of spray nozzles within said quench chamber.

19. The device according to claim 1, wherein said spray injection system within said quench chamber comprises two rows of spray nozzles, said two rows of spray nozzles oppose each other so that said exhaust gas flows perpendicular said two rows of spray nozzles.

20. The device according to claim 1, wherein said exhaust gas comprises an initial predetermined temperature of about 3,000 degrees F. and a final temperature of about 195 degrees F., and
wherein said inlet tube receives said exhaust gas at an elevated velocity of up to 2900 ft./sec.

* * * * *